Sept. 29, 1953  H. V. ROOKE  2,653,381
GRASS EDGER AND TRIMMER
Filed April 11, 1949
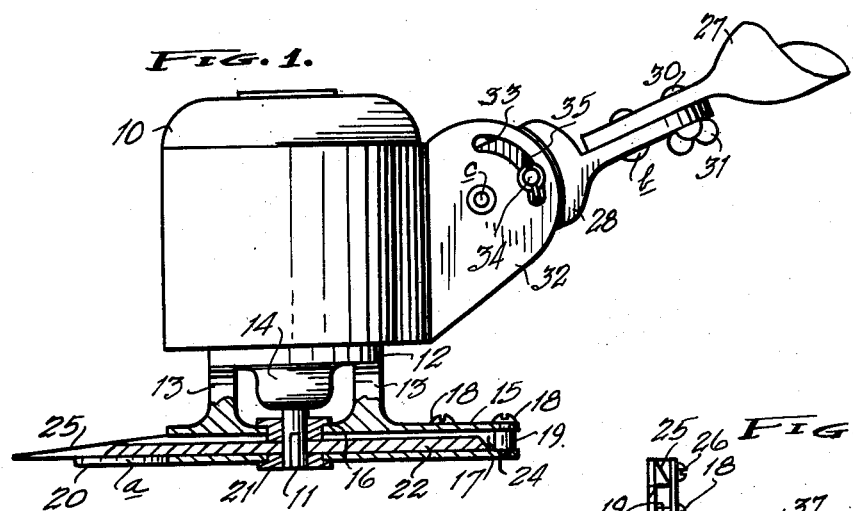
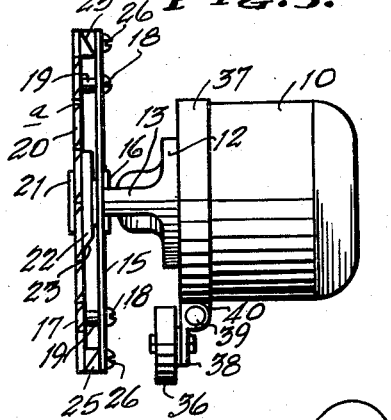
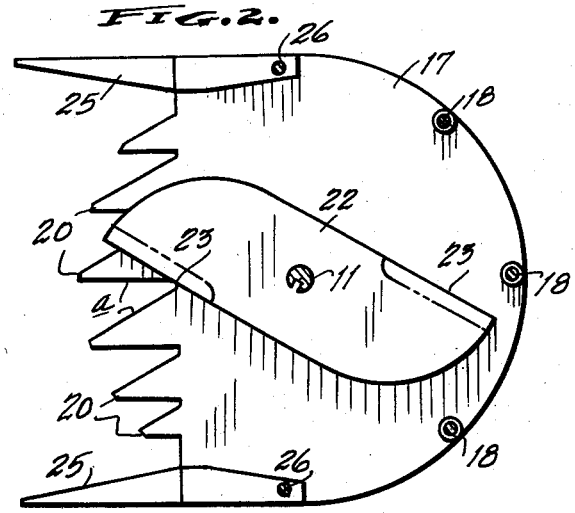
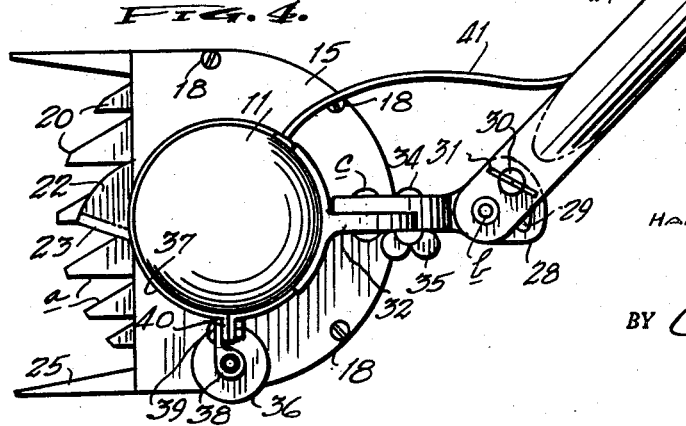
HARRY V. ROOKE
INVENTOR.
BY
ATTORNEY Patented Sept. 29, 1953

2,653,381

UNITED STATES PATENT OFFICE 2,653,381

GRASS EDGER AND TRIMMER

Harry V. Rooke, Fort Worth, Tex.

Application April 11, 1949, Serial No. 86,830

1 Claim. (Cl. 30—206)

This invention relates to grass cutting devices, and it has particular reference to a mechanism for trimming grass and hedges, and its principal object resides in the provision of a compact mechanism operated by an electric motor which has direct connection, through its shaft, with a rotating blade cooperatively associated with a cutter head having an arrangement of serrations thereon, each formed with cutting edges, whereby to afford a shearing action on grass, as along sidewalks, curbing, and other places generally inaccessible to a lawn mower, and whereby hedges, and other shrubbery, can be easily trimmed with a minimum of effort.

Another object of the invention resides in the provision of a light and compact structure, which can be economically produced, and having an operating handle adjustably secured thereto affording a convenient means of handling the device in different positions, that is, by persons of different heights, and also providing adjustment whereby the device may be used to operate either horizontally or vertically.

Broadly, the invention contemplates the provision of a trimmer device of light and economical construction which is especially adapted for use in trimming lawns and shrubbery with the least amount of effort and time.

While the foregoing objects are paramount, other and lesser objects will become manifest as the description proceeds, taken in connection with the appended drawings wherein:

Figure 1 is a side elevational view of the invention, partially shown in transverse section, illustrating the motor and the adjustable features of the handle.

Figure 2 is a plan view of the cutter head of the invention, showing the upper plate removed, and illustrating the rotary knife cooperatively associated with the cutter head.

Figure 3 is a front elevational view of the invention showing the cutting element in vertical operative position, and Figure 4 is a plan view of the invention shown in operative position on its edge, that is, having the cutting element in a vertical position.

Accordingly, the invention comprises, in combination with a motor 10 having a shaft 11, a supporting bracket 12 connected to the motor 10, or which may be integral with the housing thereof, formed with a pair of legs 13 which extend on each side of the shaft bearing 14 of the motor housing 10, as illustrated in Figure 1. Integral with the legs 13, opposite the motor 10, is a mounting plate 15 through which the shaft 11 of the motor extends, operating in a bearing 16 arranged between the legs 13 in the plate 15.

Spaced below the plate 15 is a cutting plate or head 17 secured to the plate 15 by screws 18 and spaced therefrom by spacer members 19. The cutter plate 17 is illustrated more in detail in Figure 2 and is substantially semi-circular in form, having a series of different length serrations 20 formed on its operative or forward edge. The shaft 11 also extends through this plate and a bearing 21 is arranged therein for the shaft 11 complementing the bearing 16 in the plate 15.

Keyed to the shaft 11 is a double edged blade 22 which is adapted to be rotated by the motor 10 through the shaft 11. The member 22 has cutting edges 23 formed on each end and on opposite sides of the blade 22 and each cutting edge cooperates with the serrations 20 of the plate 17, which also have cutting edges a formed thereon, so that a shearing action on grass, or other vegetation, is accomplished through the operative association between the members 17 and 22 as the member 22 is rotated and the assembly is moved forwardly. The blade 22 operates within the space 24 between the plates 15 and 17, as apparent in Figures 1 and 3.

On each side of the plate 17, and spaced by the serrations 20 thereon, are arranged guides or shoes 25 which project forwardly of the invention in operation. Each of these members is secured by screws 26 to opposite edges of the plate 17 and have their operative ends tapered outwardly in the manner shown in Figures 2 and 4. Thus, when the invention is utilized for trimming along sidewalks and curbing, as in the position shown in Figure 4, the members 25 serve as runners or guides in front of the assembly to pick up the grass shoots or fronds and aid the cutting elements in severing them.

A handle 27 is provided for the invention which has a pivotal connection at b to a bracket 28 which is formed with an arcuate slot 29 through which a bolt 30 is arranged having a thumb nut 31 thereon for adjusting the handle to different angles with respect to the bracket 28. The bracket 28 is pivotally secured at c to a bracket 32 secured to the motor 10, the latter pivot being arranged transversely of the pivot b. The bracket 32 is also provided with an arcuate slot 33 in which a bolt 34 is arranged and on which a thumb nut 35 is threaded to provide an adjustment for the brackets 29 with respect to the bracket 32. By reason of the transverse arrangement of the pivots b and c the handle 27 may be adjusted to the proper operating angle with respect to the motor 10 to permit the operation of the cutting elements in either a horizontal or vertical position, as illustrated in Figures 1 and 4.

It is desirable, when the invention is operated in a vertical position, such as that illustrated in Figures 3 and 4, that it be supported by a roller 36 which can be detachably secured to the motor 10 through the medium of a band 37 arranged therearound. The roller 36 is pivotally mounted in a supporting bracket 38 secured by a bolt 39 to integral projections 40 of the band 37, as illustrated in Figures 3 and 4. When the invention is used as a hedge trimmer, or operated so that the cutting elements are in horizontal position, as in Figure 1, the roller 36 may be removed. However, this element does not interfere with the normal operation of the invention in any position, but the detachability of the roller arrangement provides for the removal of the same if it is desirable to do so.

Current for operating the motor 10 is supplied through a conductor 41 extending down the handle 27, and a switch 42 is arranged on the handle by which the device can be properly controlled. The switch 42 is conveniently located near a suitable hand grip 43 on the upper end of the handle 27.

Manifestly, the structure herein shown and described is capable of considerable modifications, from time to time, by persons skilled in the art, without departing from the spirit and intent of the invention or the scope of the appended claim.

What is claimed is:

In an electric trimmer for lawns and hedges having an electric motor with a shaft, in combination, a bracket arranged on the housing of said motor, a mounting plate on said bracket having a journal therein for said shaft, a cutter plate secured to and spaced parallel from said mounting plate and having a plurality of serrations formed on the operative edge thereof, a rotary blade operatively arranged on said shaft between said plates, a guide projecting from either side of said serrations, a band arranged about said motor having a bracket integral therewith and projecting therefrom, a handle secured to said bracket and having means for adjusting the same to different angles in alignment with respect to the shaft of said motor and transversely thereof.

HARRY V. ROOKE.

References Cited in the file of this patent

UNITED STATES PATENTS

| Number | Name | Date |
|---|---|---|
| 953,876 | Warner | Apr. 5, 1910 |
| 1,334,112 | Myers | Mar. 16, 1920 |
| 1,389,249 | Kitchel | Aug. 30, 1921 |
| 1,665,155 | Yerger | Apr. 3, 1928 |
| 1,876,963 | Klass | Sept. 13, 1932 |
| 1,950,472 | Bowers | Mar. 13, 1934 |
| 2,119,962 | Raleigh | June 7, 1938 |
| 2,149,463 | Orr | Mar. 7, 1939 |
| 2,404,504 | Klose | July 23, 1946 |
| 2,427,265 | Dreischerf | Sept. 9, 1947 |
| 2,443,027 | Dishmaker | June 8, 1948 |
| 2,514,278 | Dunn | July 4, 1950 |